United States Patent
Yang et al.

(10) Patent No.: US 9,990,542 B2
(45) Date of Patent: Jun. 5, 2018

(54) METHOD OF SWITCHING VIDEO IMAGES AND SURVEILLANCE SYSTEM

(71) Applicant: VIVOTEK INC., New Taipei (TW)

(72) Inventors: Kai-Min Yang, New Taipei (TW); Shu-Che Weng, New Taipei (TW)

(73) Assignee: VIVOTEK INC., New Taipei (TW)

( * ) Notice: Subject to any disclaimer, the term of this patent is extended or adjusted under 35 U.S.C. 154(b) by 173 days.

(21) Appl. No.: 14/867,564

(22) Filed: Sep. 28, 2015

(65) Prior Publication Data
US 2016/0092056 A1 Mar. 31, 2016

(30) Foreign Application Priority Data
Sep. 29, 2014 (TW) .............................. 103133768 A (51) Int. Cl.
*G06K 9/00* (2006.01)
*H04N 7/18* (2006.01)

(52) U.S. Cl.
CPC ..... *G06K 9/00362* (2013.01); *G06K 9/00295* (2013.01); *G06K 9/00771* (2013.01); *H04N 7/181* (2013.01)

(58) Field of Classification Search
CPC ........... G06K 9/00362; G06K 9/00295; G06K 9/00771

USPC ......................................................... 348/143
See application file for complete search history.

(56) References Cited

U.S. PATENT DOCUMENTS

| | | | | |
|---|---|---|---|---|
| 2012/0306911 A1* | 12/2012 | Okazaki | .................. | G09F 27/00 345/625 |
| 2013/0235086 A1* | 9/2013 | Otake | ................ | H04N 5/23293 345/660 |

* cited by examiner

*Primary Examiner* — Jeffery Williams
(74) *Attorney, Agent, or Firm* — Maschoff Brennan (57) ABSTRACT

The disclosure provides a method of switching video images and a surveillance system. The method includes the following steps. A first video image is displayed under a first display mode in a monitoring interface. Whether a target object in the first video image enters into a designated region in the first video image is determined. Whether a ratio of the targeted object to the first video image is smaller than or equal to a first threshold is determined when the target object enters into the designated region. When the ratio is smaller than or equal to the first threshold, a second video image is displayed under the first display mode in the monitoring interface. The designated region in the first video image is related to a geographic position, and the second video image is a video image related to the geographic position.

20 Claims, 5 Drawing Sheets

METHOD OF SWITCHING VIDEO IMAGES AND SURVEILLANCE SYSTEM

CROSS-REFERENCE TO RELATED APPLICATIONS

This non-provisional application claims priority under 35 U.S.C. § 119(a) on Patent Application No(s). 103133768 filed in Taiwan, R.O.C. on Sep. 29, 2014, the entire contents of which are hereby incorporated by reference.

TECHNICAL FIELD

The disclosure relates to a method of switching video images and a surveillance system, more particularly to a method of switching video images for tracking a target object, and a surveillance system using the same.

BACKGROUND

In general, supervising a workplace or a public place usually needs multiple surveillance apparatuses, and the allocation of the surveillance apparatuses for various scenes is performed to clearly capture the image of each corner in the workplace or public place. For a conventional surveillance system, videos captured by these surveillance apparatuses are usually displayed on respective screens at the same time. For example, a supervisor may monitor a workplace or a public place using nine display screens arranged in a 3 by 3 grid, and each of the display screens displays a video image of a respective scene.

Actually, this is not a most efficient way having a single supervisor simultaneously watching multiple display screens. For example, if a supervisor discovers a person of interest appearing on a certain display screen and this person of interest is moving toward a different location, the supervisor has to memorize a number or location of the display screen associated with this different location in order to pay attention to the proper display screen in real time. It is obvious in such a conventional surveillance system that the supervisor cannot conveniently supervise the movement of the person of interest. Also, if such a person of interest brings about danger during a couple of seconds while the supervisor's attention is diverted, the supervisor cannot assess the situation in real-time and determine a proper plan of action, because of missing some important video images captured during this period.

SUMMARY

For this reason, the disclosure promotes a method of switching video images for tracking a moving target object and then automatically performing the switching of video images related to different geographic positions shown on a monitoring device, whereby a supervisor may conveniently monitor the moving target object shown on the monitoring interface.

According to one or more embodiments, the disclosure provides a method of switching video images. In one embodiment, the method includes the following steps. Display a first video image in a first display mode on a monitoring interface. Determine whether there is a target object on the first video image entering into a designated region in the first video image. Determine whether a ratio of the target object to the first video image is less than or equal to a first threshold when the target object enters into the designated region. Display a second video image in the first display mode on the monitoring interface when the ratio of the target object to the first video image is less than or equal to the first threshold. The designated region in the first video image is related to a geographic position, and the second video image is related to a video image of the geographic position.

In another embodiment, the method includes the following steps. Display a first video image on a monitoring interface. Determine whether a target object on the first video image enters into a designated region in the first video image. Determine whether a ratio of the target object to a second video image is larger than or equal to a third threshold when the target object into the designated region. Display the second video image on the monitoring interface when the ratio of the target object to the second video image is larger than or equal to the third threshold. The designated region in the first video image is related to a geographic position, and the second video image is related to a video image related to the geographic position.

According to one or more embodiments, the disclosure provides a surveillance system for tracking a moving target object and then automatically performing the switching of video images related to different geographic positions shown on a monitoring device so that the supervisor may conveniently monitor the target object shown on the monitoring device.

In one embodiment, the surveillance system includes a first photographic module, a second photographic module, and a monitoring device. The first photographic module captures a first video image. The second photographic module captures a second video image. The monitoring device is connected to the first and second photographic modules in order to receive the first and second video images and performs the foregoing method. The designated region in the first video image is related to a geographic position, and the second video image is related to a video image related to the geographic position.

In summary, the disclosure employs the aforementioned method and surveillance system to determine whether the target object on the first video image enters into the designated region, thereby switching from the first video image displayed on the monitoring interface to the second video image corresponding to a next position of the target object in order to conveniently monitor the target object.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
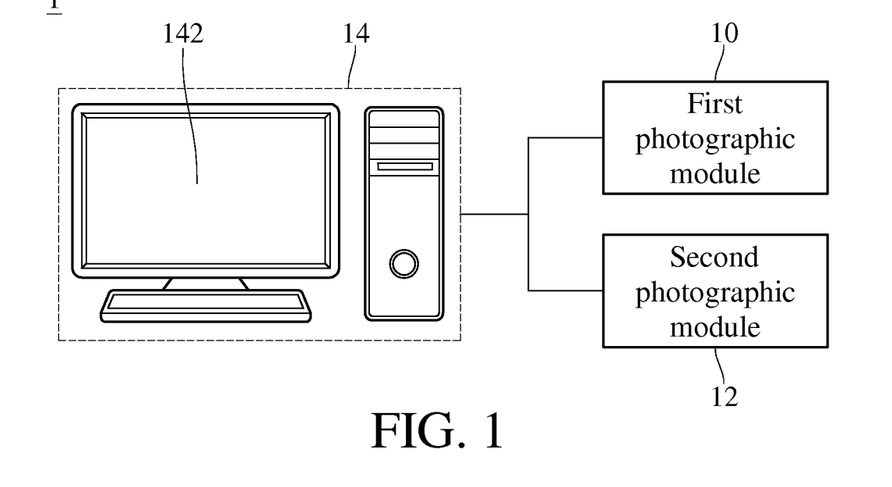
FIG. 1 is a functional block diagram of a surveillance system in an embodiment.

Please refer to FIG. 1, which is a functional block diagram of a surveillance system 1 in an embodiment. As described in FIG. 1, the surveillance system 1 includes a first photographic module 10, a second photographic module 12, and a monitoring device 14. The monitoring device 14 is coupled to the first photographic module 10 and the second photographic module 12. In this embodiment, the first photographic module 10 is used to capture images of a certain geographic position to produce first video images. The second photographic module 12 is used to capture images of a neighbor geographic position to produce second video images. The monitoring device 14 is used to receive the first video image from the first photographic module 10 and the second video image from the second photographic module 12.

In practice, the first photographic module 10 and the second photographic module 12 are, for example, unlimited to fixed video cameras, PTZ video cameras, fish-eye video cameras or other available photographic devices. Moreover, the first photographic module 10 and the second photographic module 12 send their respective video images to the monitoring device 14 by wire lines or wirelessly. The monitoring device 14 is, for example, unlimited to a computer having various computing abilities and includes a monitoring interface 142 (e.g. a display screen). Therefore, a supervisor employs the monitoring interface 142 to supervise the video images provided by the first photographic module 10 and the second photographic module 12.

It is noticed that although this embodiment is described in which two photographic modules (i.e. the first photographic module 10 and the second photographic module 12) are used to cooperate with one monitoring device (i.e. the monitoring device 14), other embodiments are contemplated in which various numbers of photographic modules may be used. Those skilled in the art should understand that this embodiment greatly describes that the monitoring device 14 is able to perform the switching of various video images produced by various photographic modules in order to automatically track a target object, so the number of photographic modules can be increased according to various designs. The target object herein is, for example, not limited to a human, goods or other target that is necessary to be tracked.

Figure 2:
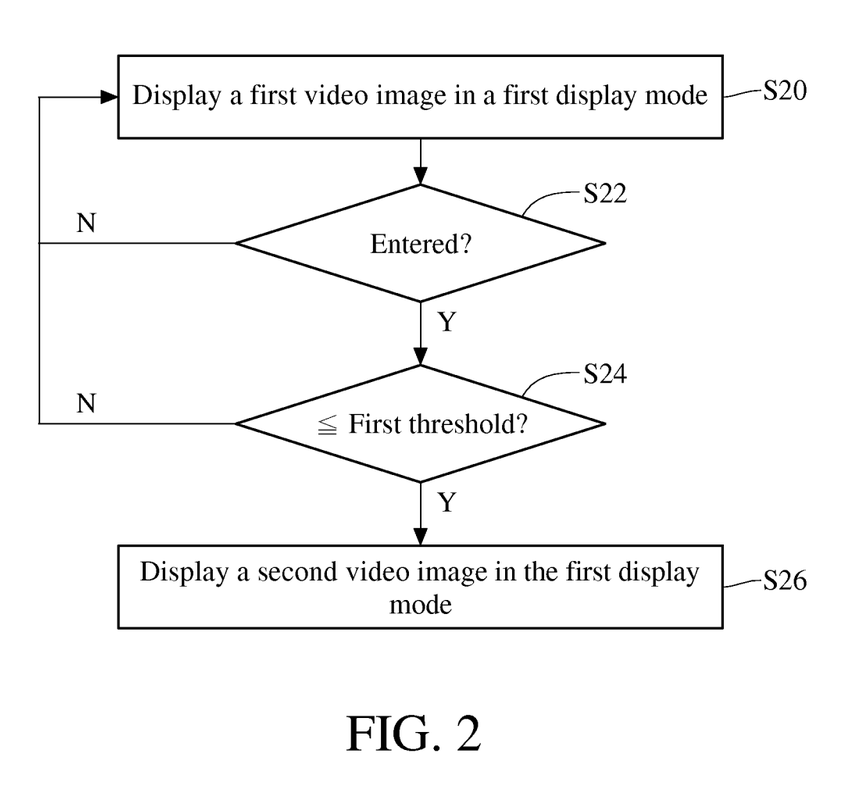
FIG. 2 is a flow chart of a method of switching video images in an embodiment.

To clarify the method of switching video images in the disclosure, please refer to FIG. 1 and FIG. 2. FIG. 2 is a flow chart of a method of switching video images in an embodiment. The monitoring interface 142 of the monitoring device 14 herein supports various display modes. As described in the drawings, in step S20, the monitoring interface 142 of the monitoring device 14 displays a first video image in a first display mode. The first display mode herein is a full-screen mode or a preset mode that is self-defined. For example, when displaying the first video image in the full-screen mode, the monitoring interface 142 displays only the first video image. In this situation, the supervisor can pay attention to the target object shown in the first video image. Alternatively, when displaying the first video image in the preset mode, the monitoring device 14 displays the video image from the first photographic module 10 by a preset size or an original size.

Figure 3A:
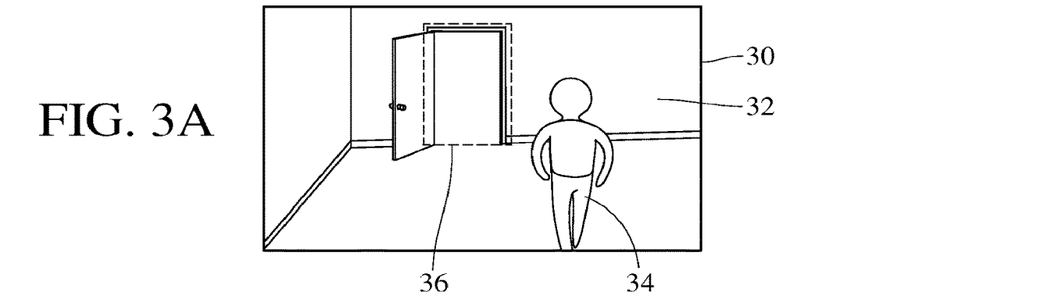
FIG. 3A to FIG. 3D are schematic diagrams for illustrating the method of switching video images in an embodiment.

In practice, please refer to FIGS. 3A to 3D, which are schematic diagrams for illustrating the method of switching video images in an embodiment. In step S20, a display block 30 in the monitoring interface 142 is displaying a first video image 32, as shown in FIG. 3A. Because the disclosure does not limit the type of the first display mode, the display block 30 may be the monitoring interface 142 as a whole (i.e. the full-screen mode) or the monitoring interface 142 in part (i.e. the preset mode). In this example, a certain person to be supervised shown in the first video image 32 is defined as a target object 34, and a region presenting the door shown in the first video image 32 is defined as a designated region 36.

Figure 3B:
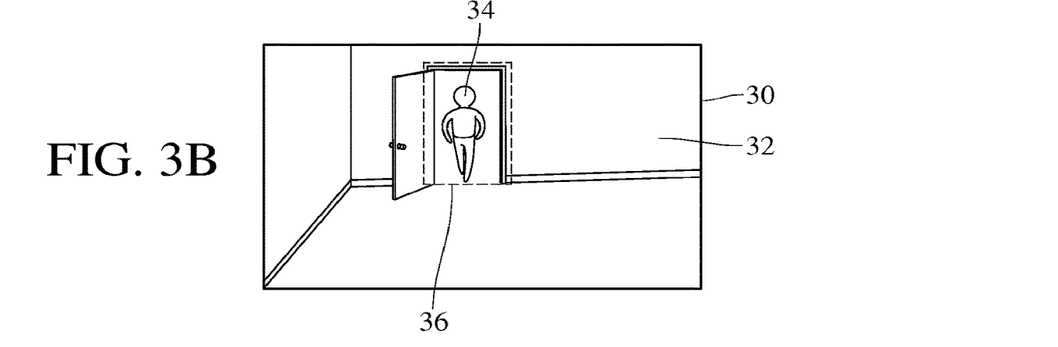

Then, in step S22, the monitoring device 14 determines whether the target object 34 on the first video image 32 enters into the designated region 36 in the first video image 32. If yes, the monitoring device 14 further determines whether the target object 34 all has entered as a whole (or in significant part) into the designated region 36 while the target object 34 (i.e. a man) just enters (i.e. walks) into the designated region 36 (i.e. the door) as shown in FIG. 3B. Otherwise, when the target object 34 still stays outside and has not entered into the designated region 36 (nor the second video image 38) as shown in FIG. 3A, the monitoring interface 142 of the monitoring device 14 still continues to display first video images in the first display mode.

In an example, when the monitoring device 14 detects that the target object 34 enters into the designated region 36 in the first video image 32, the monitoring device 14 may further mark the designated region 36, into which the target object 34 enters, in the first video image 32. In this way, if there is more than one region in the first video image 32 for a certain target object to enter into, even though the supervisor does not see which region the target object 34 moves to, it is able to track the whereabouts of the target object 34 using the marked designated region 36 afterwards.

Subsequently, in step S24, after the target object 34 enters into the designated region 36, the monitoring device 14 further determines whether a ratio of the target object 34 to the first video image 32 is less than or equal to a first threshold. It should be noticed that this embodiment is unlimited to which the ratio of the target object 34 to the first video image 32 is absolutely identical to the first threshold. To avoid having misunderstanding to the term "less than or equal to" herein, the term "less than or equal to" in this embodiment can be realized as "smaller or the same". That is, when the target object 34 has entered into the designated region 36, then the monitoring device 14 further determines whether the ratio of the target object 34 to the first video image 32 is less than the first threshold, which should still be covered in step S24. The persons skilled in the art should understand that when such a threshold condition (i.e. the ratio of the target object 34 to the first video image 32 is equal to the first threshold) occurs, the outcome of the determination made by the monitoring device 14 in step S24 will not affect the spirit of the disclosure.

Herein, the ratio of the target object 34 to the first video image 32 may sufficiently be interpreted as a ratio of the target object 34 to the designated region 36 since a ratio of the first video image 32 to the designated region 36 is substantially constant, but the disclosure will not be limited thereto. The calculation of such a ratio is performed, for example, but not limited to, by a number of pixels for the target object 34 and a number of pixels for the first video image 32 or the designated region 36, or by an area of pixels presenting the target object 34 and an area of pixels presenting the first video image 32 or the designated region 36, or by other available methods known in the art.

Figure 3C:
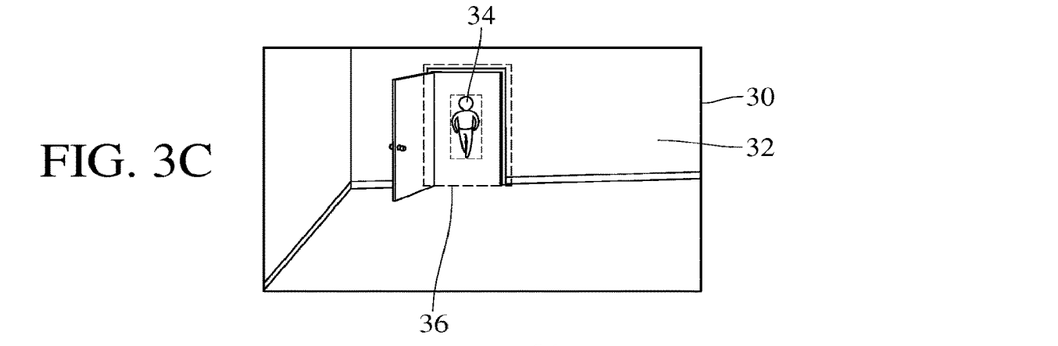
Figure 3D:
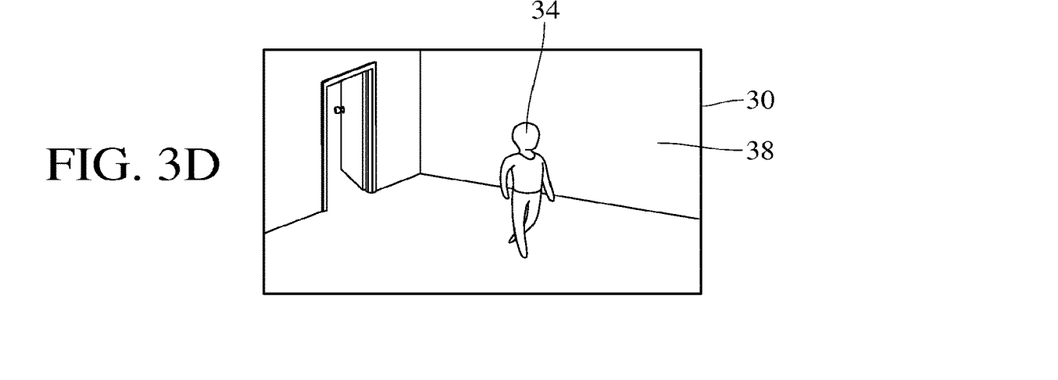

As described in step S24 with respect to FIG. 3C, in which the target object 34 has entered (i.e. walked) into the designated region 36 (i.e. the door), the more the target object 34 walks into the designated region 36 deeply (i.e. in a direction vertical to the image plane), the smaller the size of the target object 34 is. Alternatively, when the target object 34 turns left or right after entering into the designated region 36, the target object 34 is gradually covered by the background (i.e. the wall) in the first video image 32 and then the ratio of the target object 34 to the designated region 36 also gradually becomes smaller. Therefore, the monitoring device 14 can determine the timing of switching to a video image of next scene by such a ratio. If the ratio of the target object 34 to the first video image 32 is still larger than the first threshold, then the monitoring interface 142 of the monitoring device 14 will continue displaying the first video image in the first display mode.

Conversely, if the ratio of the target object 34 to the first video image 32 is less than or equal to first threshold, the monitoring interface 142 displays the second video image 38 in the first display mode in step S26. As described in step S26 with respect to FIG. 3D, when the monitoring device 14 determines that the ratio of the target object 34 to the first video image 32 is less than or equal to the first threshold, it indicates that the target object 34 has surely entered into the designated region 36. Herein, the monitoring device 14 will directly switch to a video image of a next scene, that is, the second video image 38. In a practical example, the first photographic module 10 is disposed outside the door as the second photographic module 12 is disposed inside the door, so that the first video image 32 is an image of outdoor scene captured by the first photographic module 10 and the second video image 38 is an image of indoor scene captured by the second photographic module 12.

It should be noticed that the first threshold is varied with the positions of the first photographic module 10 and the second photographic module 12 in order to obtain previous and current video images of the target object 34 having a high definition. For example, if the second photographic module 12 is located very near the door and can capture clear images of the target object 34 entering into the door, the first threshold may be relatively large. In other words, it may be unnecessary that switching to the second video image 38 is not performed until the ratio of the target object 34 to the first video image 32 has greatly reduced. In contrast, if the second photographic module 12 is a significant distance away from the door and the second photographic module 12 cannot capture clear images of the target object 34 until the target object 34 enters into the door more deeply, the first threshold may relatively be small. In other words, switching to the second video image 38 is not performed until the ratio of the target object 34 to the first video image 32 becomes sufficiently small.

In another embodiment, the first threshold is zero. In an embodiment in which the first threshold is zero, only if the target object 34 disappears in the designated region 36 is the switching of video images performed. For example, if the target object 34 turns left or right and goes forward after entering into the designated region 36, the target object 34 is gradually covered by the background (i.e. the wall) in the first video image 32 more and more, resulting in the disappearance of the target object 34 in the designated region 36.

In this situation, the ratio of the target object 34 to the first video image 32 herein is equal to zero.

In another embodiment, video images of a previous scene and video images of a current scene are simultaneously displayed as described below with respect to FIG. 1 and FIG. 4, which is a flow chart of a method of switching video images in another embodiment. As the same as the foregoing embodiment, the monitoring interface 142 of the monitoring device 14 displays the first video image 32 in the first display mode in step S40, and the monitoring device 14 in step S42 determines whether the target object 34 in the first video image 32 enters into the designated region 36 in the first video image 32.

However, differently, in step S44, when the target object 34 enters into the designated region 36, the monitoring device 14 will further determine whether the ratio of the target object 34 to the first video image 32 is less than or equal to second threshold. In an example, the monitoring device 14 determines that the ratio of the target object 34 to the first video image 32 is greater than a second threshold. This situation indicates that the target object 34 has not entered into a next scene yet so that the monitoring interface 142 of the monitoring device 14 will still display first video images in the first display mode.

Conversely, in step S46, when the ratio of the target object 34 to the first video image 32 is less than or equal to second threshold, the monitoring device 14 further determines whether the ratio of the target object 34 to the first video image 32 is less than or equal to the first threshold. In practice, the second threshold is different from the first threshold so that the disclosure can at different stages decide when to switch from the first video image 32 to the second video image 38.

Figure 5:
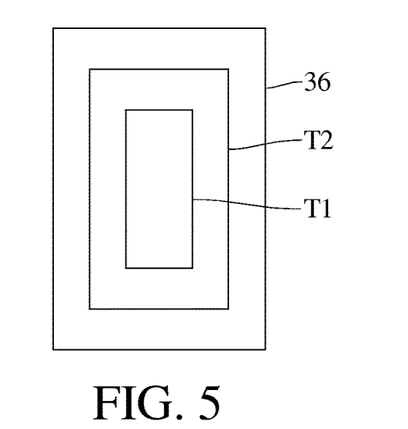
FIG. 5 is a schematic diagram of video images in a certain ratio in an embodiment.

Embodiments of the relationship between the second threshold and the first threshold are described below with respect to FIG. 5, which is a schematic diagram of video images in a certain ratio in an embodiment. The first threshold T1 and the second threshold T2 are thresholds of ratio and are used to assist in determining the area of the target object 34 occupying the designated region 36. Generally, when the target object 34 gradually disappears in the current scene from the designated region 36, the target object 34 is gradually away from the viewer. Therefore, the ratio of the target object 34 to the designated region 36 is getting smaller.

In a practical example, as described above, when the target object 34 enters into the designated region 36 and the ratio of the target object 34 to the designated region 36 is less than or equal to the first threshold T1, the target object 34 is sufficiently deep into a next scene and the monitoring device 14 may directly display a video image (i.e. the second video image 38) of the next scene in the first display mode in step S48. However, when the target object 34 has entered into the designated region 36 and the ratio of the target object 34 to the designated region 36 is not less than or equal to the first threshold T1 but is less than or equal to the second threshold T2, the target object 34 is insufficiently deep into the next scene. In this situation, if switching from the first video image 32 to the second video image 38 shown in the display block 30 is suddenly performed, some important details in the video images may accidentally be skipped.

Accordingly, the method further includes step S50, in which the monitoring interface 142 simultaneously display at least a part of the first video image 32 and at least a part of the second video image 38 in the second display mode when the target object 34 enters into the designated region 36 and the ratio of the target object 34 to the designated region 36 is not less than or equal to the first threshold T1 but is less than or equal to the second threshold T2. In this way, the supervisor can simultaneously see the first video image 32 and the second video image 38 shown in the display block 30. It is noticed that the above second display mode is a picture-in-picture (PIP) mode or a picture-by-picture (PBP) mode, the first video image 32 and the second video image 38 may be scaled down, clipped or subjected to other image processes in the second display mode. The persons skilled in the art should understand that one of the two video images simultaneously displayed in the display block 30 may have different content, image quality, and/or size as compared to its individual display, and thus, will not be repeated hereinafter.

Figure 6A:
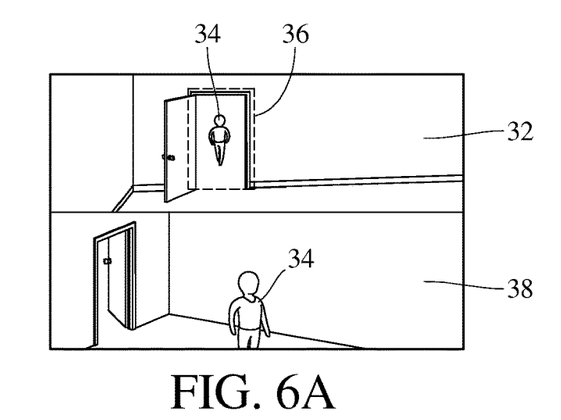
FIG. 6A and FIG. 6B are schematic diagrams of the monitoring interface in the second display mode in another embodiment.
Figure 6B:
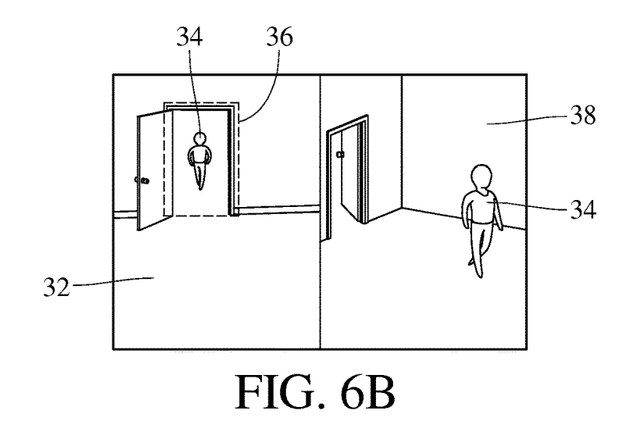

In an example, the second display mode is a row-type PBP mode, in which at least one part of the first video image 32 and at least one part of the second video image 38 are simultaneously displayed, as shown in, for example, FIG. 6A, which is a schematic diagram of the monitoring interface in the second display mode in another embodiment. In another example, the second display mode is a column-type PBP mode, in which at least one part of the first video image 32 and at least one part of the second video image 38 are simultaneously displayed, as shown in, for example, FIG. 6B, which is a schematic diagram of the monitoring interface in the second display mode in another embodiment. Notice that although the first video image 32 and the second video image 38 may be clipped in the second display mode, the clipping is not performed randomly. For example, at least surroundings of the target object 34 shall remain in the first video image 32 and the second video image 38, whereby the supervisor may efficiently supervise the target object 34.

Figure 4:
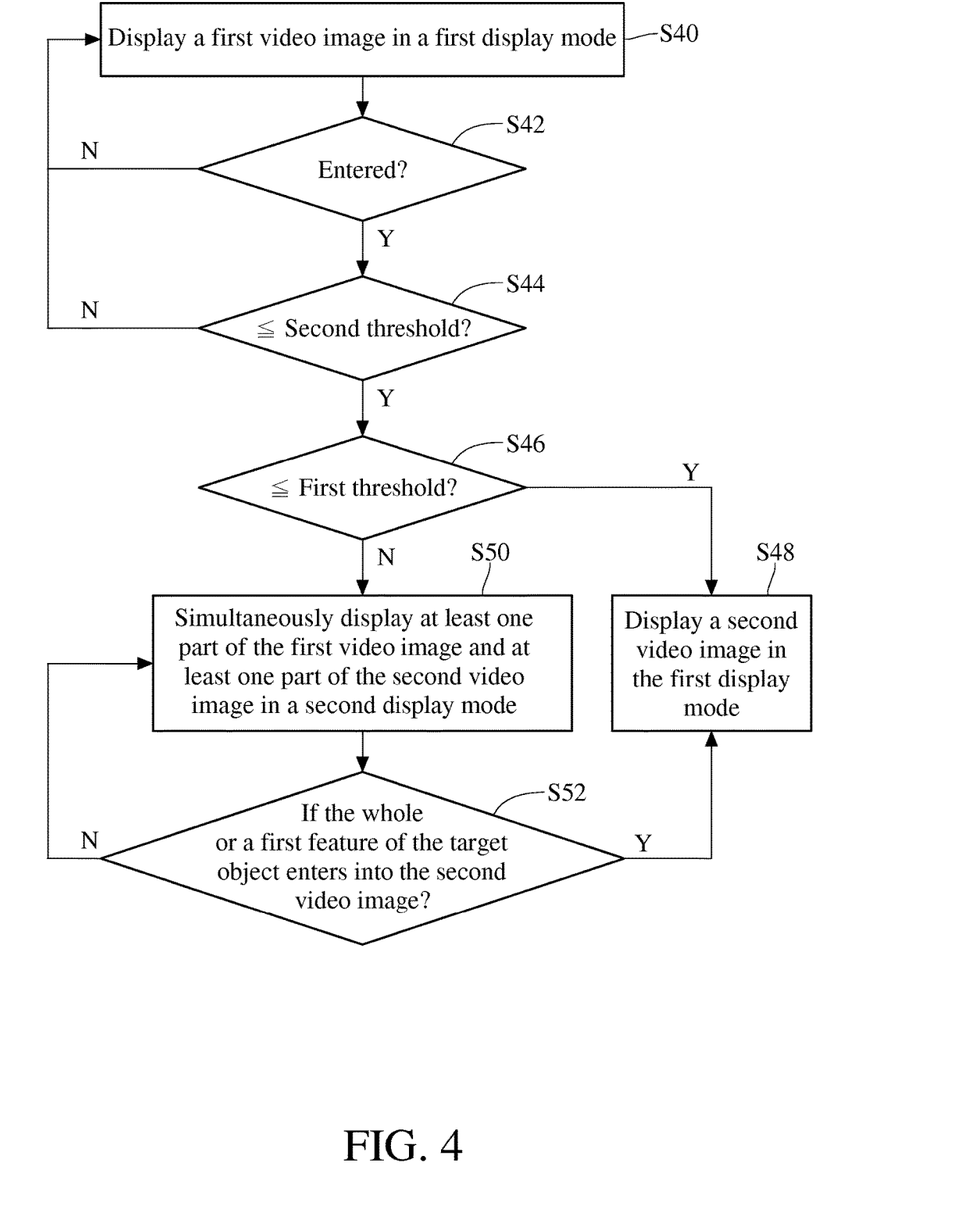
FIG. 4 is a flow chart of a method of switching video images in another embodiment.

In step S52, as shown in FIG. 4, the monitoring device 14 determines whether the whole or a first feature of the target object 34 enters into the second video image 38 completely or not. When the whole or first feature of the target object 34 has entered into the second video image 38, it indicates the supervisor herein can handle the target object 34 using the second video image 38 without the assistance of the first video image 32. As a result, the monitoring device 14 then directly displays a video image of a next scene (i.e. the second video image 38) in the first display mode, as described in step S48. Conversely, when the whole or first feature of the target object 34 has not completely entered into the second video image 38 yet, then the supervisor still needs the assistance of the first video image 32. Herein, the monitoring interface 142 of the monitoring device 14 continues displaying the first video image 32 and the second video image 38 in the second display mode simultaneously (i.e. returning to step S50).

In an example, the above outcome of determining whether the target object 34 completely enters into the second video image 38, made by the monitoring device 14 in step S52 is based on that the entire edge of the target object 34 has entered into the second video image 38. In another example, the above outcome of determining whether the target object 34 completely enters into the second video image 38, made in step S52 is obtained using the determination in step S46, where when the monitoring device 14 determines that the ratio of the target object 34 to the first video image 32 is less than or equal to the above first threshold, the target object 34 is considered completely-entering into the second video image 38. On the other hand, in an example in which the target object 34 is a human, the first feature of the target object 34 is this human's face or limbs or something put thereon. In an example, if this human's face has been shown in the second video image 38 clearly, there is no need to use the assistance of the first video image 32. In another example, if this human's arm is clearly shown in the second video image 38, the monitoring device 14 will directly display a video image of a next scene (i.e. a new second video image 38) in the first display mode without the assistance of the first video image 32 when it is predeterminedly unnecessary to see other parts of the human. Although embodiments are described like above, the persons skilled in the art should understand that other embodiments are contemplated in which the so-called first feature is any feature of a target object, which is sufficiently used to identify and handle the target object, and thus, the disclosure will not describe them hereinafter.

In addition to the automatic switching of video images of next scenes by the monitoring device 14 in the first display mode made, the supervisor can manually control the monitoring device 14 to display a video image of a next scene in the first display mode. For example, when the monitoring interface 142 of the monitoring device 14 simultaneously displays the first video image 32 and the second video image 38 in the second display mode, a switching notice may pop up in the monitoring interface 142 to notify or query the supervisor about the requirement of switching to the second video image 38. If the decision of switching to the second video image 38 in the switching notice is made, the monitoring interface 142 then displays the second video image 38 in the first display mode in response.

In an example, the first video image 32 may show more than one object so that the monitoring device 14 can calculate a characteristic value (e.g. score) associated with each object and then compare these characteristic values, so as to define the object having the maximum characteristic value to be the target object 34 as compared to the others. In practice, the monitoring device 14 predeterminedly has a table of characteristic values in an embodiment. For example, it is not easy to identify the face of a person putting on a safety helmet so that the safety helmet as a feature may have a higher characteristic value. For another example, the face of an unwelcome person who has been blacklisted for a casino or for a suspected habitual-thief may have a higher characteristic value when considered a feature. For another example, if a male is discovered outside a female dressing room, this guy as a feature may have a higher characteristic value. In an embodiment based on the previous examples, the monitoring device 14 further performs a face recognition procedure to determine a person is male or female or has a certain face in order to give it a characteristic value. For another example, a person who holds a knife or weapon in a railroad car (also known as railcar, railway wagon or railway carriage) or on a platform in a public transport system may have a higher characteristic value because such a guy very possibly puts other people there in peril.

Further, for example, a person wears an overcoat in the summer or carries big luggage may possibly smuggle contraband or steal goods, a preset characteristic value for such people may relatively be lower as compared to the above embodiments. In another example, although a person wearing a vest and/or shorts in the winter looks strange, such a person may not cause immediate jeopardy, and thus, a preset characteristic value for this guy may be much lower. In other words, the supervisor can manually set the characteristic value of each feature on the monitoring device 14, and the setting of characteristic values is varied based on the position instance of the surveillance system 1. It is noticed that the disclosure will not have any limit in which feature a target object has will lead to a higher characteristic value, and thus, the persons skilled in the art can unlimitedly set the relationship between a feature and its characteristic value according to their actual requirements. In an embodiment, a target object is unlimited to have one or more characteristic values. For example, both the face and dressing of a person can be considered to be the expression of this person. Therefore, the monitoring device 14 is also capable of maintaining a plurality of tables each records characteristic values in order to arrange, compare, or decide which people should be tracked after each characteristic value is weighted and calculated.

Figure 7:
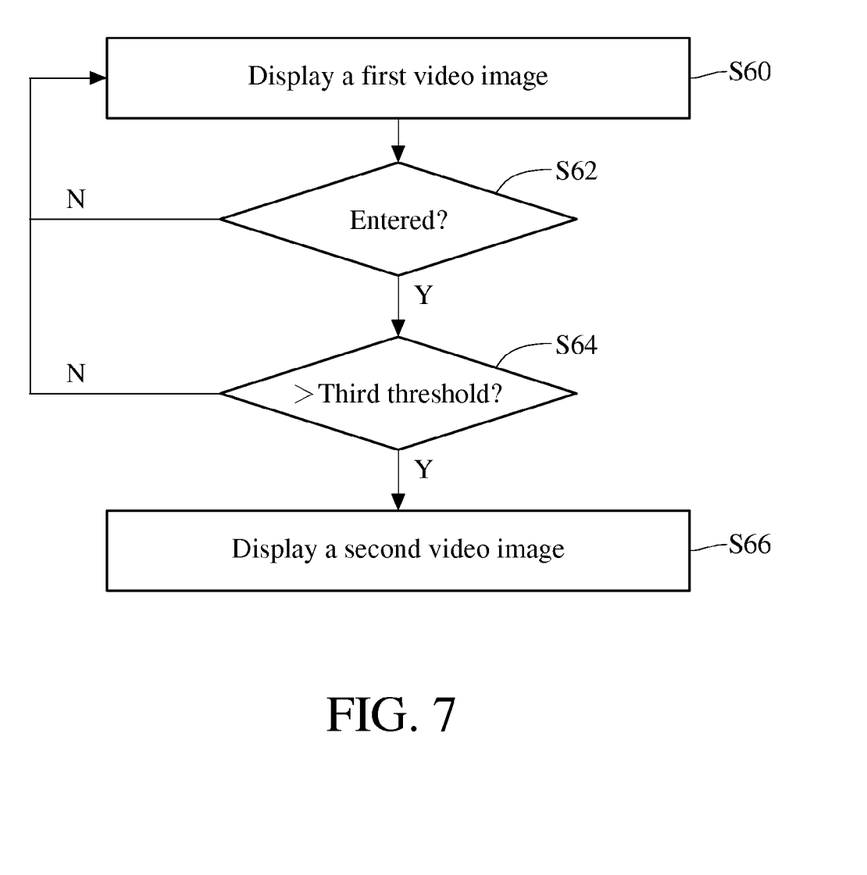
FIG. 7 is a flow chart of a method of switching video images in another embodiment.

Embodiments are contemplated in which the monitoring device 14 may decide the timing of switching to the second video image without calculating or determining the ratio of the target object to the first video image. Please refer to FIG. 1 and FIG. 7. FIG. 7 is a flow chart of a method of switching video images in another embodiment. Steps S60 and S62 in FIG. 7 are the same as the previous embodiments. The monitoring interface 142 of the monitoring device 14 displays the first video image 32 and determines whether the target object 34 in the first video image 32 enters into the designated region 36 in the first video image 32.

Differently, in step S64, the monitoring device 14 determines whether the ratio of the target object 34 to the second video image 38 is larger than or equal to a third threshold. When the monitoring device 14 determines that the ratio of the target object 34 to the second video image 38 is still smaller than the third threshold, it indicates that the target object 34 in the second video image 38 has not been clear enough or identifiable yet, the monitoring interface 142 continues displaying the first video image 32. When the monitoring device 14 determines that the target object 34 shown in the second video image 38 is clear enough or identifiable, the ratio of the target object 34 to the first video image 32 herein does not matter any more and the monitoring interface 142 directly displays the second video image 38, as described in step S66.

As set forth above, either of the method of switching video images and the surveillance system in the disclosure can be used to determine whether a target object enters into a designated region in a first video image, so as to switch to the display of a second video image corresponding to the movement of the target object in the monitoring interface. In this way, when a certain person is set as a target object to be locked onto, the disclosure can track such a target object that is moving and employ the monitoring interface to automatically switch the display of video images. Therefore, the supervisor may not divert attention from the target object or the target object may not suddenly disappear from the supervisor's view, so as to achieve a better and more convenient surveillance of the target object.

What is claimed is:

1. A method of switching video images, comprising:
    displaying a first video image in a first display mode on a monitoring interface;
    determining whether there is a target object on the first video image entering into a designated region in the first video image;
    determining whether a ratio of the target object to the first video image is less than or equal to a first threshold when the target object enters into the designated region; and
    displaying a second video image in the first display mode on the monitoring interface when the ratio of the target object to the first video image is less than or equal to the first threshold;
    wherein the designated region in the first video image is related to a geographic position, and the second video image is related to a video image of the geographic position.

2. The method according to claim 1, further comprising:
    further determining whether the ratio of the target object to the first video image is less than or equal to a second threshold when the target object enters into the designated region; and
    simultaneously displaying at least one part of the first video image and at least one part of the second video image in a second display mode on the monitoring interface when the ratio of the target object to the first video image is less than or equal to the second threshold and is larger than the first threshold.

3. The method according to claim 2, wherein simultaneously displaying the at least one part of the first video image and the at least one part of the second video image in the second display mode on the monitoring interface comprises:
    determining whether the target object completely appears in the second video image; and
    displaying the second video image in the first display mode on the monitoring interface when the target object completely appears in the second video image.

4. The method according to claim 2, wherein simultaneously displaying the at least one part of the first video image and the at least one part of the second video image in the second display mode on the monitoring interface comprises:
    determining whether a first feature on the target object completely appears in the second video image; and
    displaying the second video image in the first display mode on the monitoring interface when the first feature on the target object completely appears in the second video image.

5. The method according to claim 2, wherein simultaneously displaying the at least one part of the first video image and the at least one part of the second video image in the second display mode on the monitoring interface comprises:
    providing a switching notice; and
    displaying the second video image in the first display mode on the monitoring interface when the switching notice is selected.

6. The method according to claim 1, further comprising:
    marking the designated region, where the target object enters, in the first video image.

7. The method according to claim 1, wherein when the target object leaves the designated region in the first video image and has not entered into the second video image yet, the first video image is displayed in the first display mode on the monitoring interface.

8. The method according to claim 1, wherein when there is a plurality of objects existing in the first video image, the method further comprises:
    calculating a characteristic value related to each of the plurality of objects;
    comparing the characteristic values with each other; and
    selecting one object, having the maximum characteristic value, among the plurality of objects to be the target object.

9. The method according to claim 8, wherein the plurality of objects is humans, and calculating the characteristic value related to each of the plurality of objects is performed using a face recognition procedure.

10. The method according to claim 1, wherein the first video image and the second video image are obtained from different video capturing devices, respectively.

11. A surveillance system, comprising:
a first photographic module configured to capture a first video image;
a second photographic module configured to capture a second video image; and
a monitoring device, connected to the first photographic module and the second photographic module and configured to receive the first video image and the second video image and perform a method of switching video images,
wherein the method comprises:
displaying the first video image in a first display mode on a monitoring interface;
determining whether there is a target object on the first video image entering into a designated region in the first video image;
determining whether a ratio of the target object to the first video image is less than or equal to a first threshold when the target object enters into the designated region; and
displaying the second video image in the first display mode on the monitoring interface when the ratio of the target object to the first video image is less than or equal to the first threshold;
wherein the designated region in the first video image is related to a geographic position, and the second video image is related to a video image of the geographic position.

12. The surveillance system according to claim 11, the method further comprises:
further determining whether the ratio of the target object to the first video image is less than or equal to a second threshold when the target object enters into the designated region; and
simultaneously displaying at least one part of the first video image and at least one part of the second video image in a second display mode on the monitoring interface when the ratio of the target object to the first video image is less than or equal to the second threshold and is larger than the first threshold.

13. The surveillance system according to claim 12, wherein simultaneously displaying the at least one part of the first video image and the at least one part of the second video image in the second display mode on the monitoring interface comprises:
determining whether the target object completely appears in the second video image; and
displaying the second video image in the first display mode on the monitoring interface when the target object completely appears in the second video image.

14. The surveillance system according to claim 12, wherein simultaneously displaying the at least one part of the first video image and the at least one part of the second video image in the second display mode on the monitoring interface comprises:
determining whether a first feature on the target object completely appears in the second video image; and
displaying the second video image in the first display mode on the monitoring interface when the first feature on the target object completely appears in the second video image.

15. The surveillance system according to claim 12, wherein simultaneously displaying the at least one part of the first video image and the at least one part of the second video image in the second display mode on the monitoring interface comprises:
providing a switching notice; and
displaying the second video image in the first display mode on the monitoring interface when the switching notice is selected.

16. The surveillance system according to claim 12, the method further comprises:
marking the designated region, where the target object enters, in the first video image.

17. The surveillance system according to claim 12, wherein when the target object leaves the designated region in the first video image and has not entered into the second video image yet, the first video image is displayed in the first display mode on the monitoring interface.

18. The surveillance system according to claim 11, wherein when there is a plurality of objects existing in the first video image, the method further comprises:
calculating a characteristic value related to each of the plurality of objects;
comparing the characteristic values with each other; and
selecting one object, having the maximum characteristic value, among the plurality of objects to be the target object.

19. The surveillance system according to claim 18, wherein the plurality of objects is humans, and calculating the characteristic value related to each of the plurality of objects is performed using a face recognition procedure.

20. The surveillance system according to claim 11, wherein the first video image and the second video image are obtained from different video capturing devices, respectively.

* * * * *